United States Patent
Auxerre

(10) Patent No.: US 6,543,504 B2
(45) Date of Patent: Apr. 8, 2003

(54) BEAD FOR A RADIAL TIRE

(75) Inventor: Pascal Auxerre, Royat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/887,317

(22) Filed: Jun. 22, 2001

(65) Prior Publication Data

US 2001/0054467 A1 Dec. 27, 2001

Related U.S. Application Data

(63) Continuation of application No. PCT/EP99/10133, filed on Dec. 20, 1999.

(30) Foreign Application Priority Data

Dec. 24, 1998 (FR) .............................. 98 16478

(51) Int. Cl.$^7$ .............................. B60C 1/00; B60C 15/00
(52) U.S. Cl. .................. 152/547; 152/539; 152/540; 152/552; 152/554
(58) Field of Search .................. 152/539, 540, 152/543, 546, 547, 552, 554, 555

(56) References Cited

U.S. PATENT DOCUMENTS

| | | | |
|---|---|---|---|
| 4,953,605 A | * 9/1990 | Kawamura et al. ......... 152/541 |
| 5,196,077 A | 3/1993 | Kaga | |
| 5,433,257 A | 7/1995 | Yamaguchi et al. | |
| 5,526,863 A | 6/1996 | Hodges | |
| 5,772,811 A | 6/1998 | Ueyoko et al. | |
| 5,979,527 A | 11/1999 | Kobayashi et al. | |

FOREIGN PATENT DOCUMENTS

| | | | |
|---|---|---|---|
| AU | 590423 | | 11/1989 |
| JP | 3-42310 | * | 2/1991 |
| JP | 5-77616 | * | 3/1993 |
| JP | 7-117419 | * | 5/1995 |
| JP | 7-144517 | * | 6/1995 |
| JP | 10-211806 | * | 8/1998 |

OTHER PUBLICATIONS

U.S. patent application Ser. No. 09/767,573, filed Jan. 23, 2001, by Pascal Auxerre.

* cited by examiner

Primary Examiner—Michael W. Ball
Assistant Examiner—Justin Fischer
(74) Attorney, Agent, or Firm—Baker Botts L.L.P.

(57) ABSTRACT

A tire having a radial carcass reinforcement, anchored in each bead to an anchoring bead wire to form an upturn, characterized in that a profiled member of vulcanized rubber mix is arranged axially to the outside of the upturn of the carcass reinforcement, the secant modulus of elasticity in tension of which, measured for a relative elongation of 10%, is very much greater than the moduli of the other mixes forming the bead, the main part of the carcass reinforcement having a substantially rectilinear meridian profile between its point of tangency to the anchoring bead wire and a point A located at a radial distance $H_A$ from the base D of the beads of between 35% and 65% of the radial distance $H_E$ between the points of maximum axial width of the carcass reinforcement and said base D.

8 Claims, 3 Drawing Sheets

BEAD FOR A RADIAL TIRE

This is a continuation of pending application PCT/EP99/10133, filed Dec. 20, 1999.

BACKGROUND OF THE INVENTION

The present invention relates to a tire with radial carcass reinforcement, and more particularly to a "heavy-vehicle"-type tire, intended to be fitted on a vehicle, such as a lorry, road tractor, bus, trailer and others. More specifically, it relates to a novel bead structure.

Generally, a tire of the type in question comprises a carcass reinforcement formed of at least one ply of metal cables, which is anchored in each bead to at least one bead wire, forming an upturn. The carcass reinforcement is radially surmounted by a crown reinforcement, composed of at least two plies of metal cables, crossed from one ply to the next and forming angles of between 10° and 45° with the circumferential direction. The carcass reinforcement upturns are generally reinforced by at least one ply of metal cables oriented at a small angle relative to the circumferential direction.

In the case of the tire in question, the reinforcement ply of the bead may be wound around the bead wire, so as to have an axially outer strand and an axially inner strand, the radially upper end of the axially inner strand being generally located beneath the radially upper end of the axially outer strand.

The known solution aims to avoid deradialization of the cables of the upturn of the carcass reinforcement, and to minimize the radial and circumferential deformations to which the end of said upturn, and the outer layer of rubber covering the bead and effecting the connection to the rim are subjected.

French Application FR 98/09451 of Jul. 23, 1998, in order to improve the endurance of a tire having beads intended to be mounted on rim seats which are flat or are inclined at 5°, uses a bead reinforcement armature having radial elements. The tire described in said application has each bead provided with a first reinforcement armature formed of at least one ply of radial reinforcement elements which is wound around the anchoring bead wire of the carcass reinforcement and on the inside of said carcass reinforcement to form two strands such that the axially inner strand, between its radially upper edge parallel to the meridian profile of the carcass reinforcement and its point of tangency to the anchoring bead wire, follows a rectilinear trace referred to as "shortest-path" and that the radially upper end of said axially inner strand is radially located at a distance $H_{LI}$ from the base of the bead of between 80% and 160% of the distance $H_{RNC}$, the radial distance between the end of the carcass reinforcement upturn and the base of the bead, the second armature of elements inclined relative to the radial direction not being wound around said anchoring bead wire and arranged axially to the outside of the carcass reinforcement upturn.

The radial reinforcement elements of the ply or plies of the bead reinforcement armature are preferably inextensible metallic elements, made of steel and in the form of cables.

The French application referred to above furthermore proposes, in order to improve the resistance of the carcass reinforcement to rupture of reinforcement elements occurring in its portions which form an integral part of the beads, to impart to said portions the same profile as that of the bead reinforcement plies having radial elements, that is to say, a rectilinear profile.

Research has shown that such a bead reinforcement structure with, in particular, a rectilinear meridian profile of the main part of the carcass reinforcement which is at a tangent to the anchoring bead wire could be substantially improved by a judicious selection of the vulcanized rubber mixes forming the bead of the tire.

SUMMARY OF THE INVENTION

The tire according to the invention, having a radial carcass reinforcement, anchored in each bead to an anchoring bead wire to form an upturn, the anchoring bead wire being surmounted radially by a first profiled member of vulcanized rubber mix and of a substantially triangular shape when viewed in meridian section, the upper edge of the upturn being separated from the main part of said reinforcement by a second profiled member of vulcanized rubber mix, is characterized in that the secant modulus of elasticity in tension of the first profiled member, measured for a relative elongation of 10%, is between 8 and 10 MPa, whereas the secant modulus of elasticity in tension of the second profiled member, measured under the same conditions, is between 3 and 5 MPa, a third profiled member of vulcanized rubber mix being arranged axially to the outside of the carcass reinforcement upturn and the secant modulus of elasticity in tension of which, measured under the same conditions, is between 35 and 50 MPa, whereas a fourth profiled member radially surmounting the third profiled member has a secant modulus of elasticity in tension, measured under the same conditions, of between 3 and 5 MPa, the radially lower end of said fourth profiled member being located radially at a distance less than the distance between the end of the upturn of the carcass reinforcement and the base D of the beads, the third profiled member having a thickness which decreases radially towards the outside, such that the radial distance separating the straight line D from the point of the straight line parallel to the axis of rotation for which said thickness is equal to 10% of the maximum thickness is less than the radial distance between the end of the carcass reinforcement upturn and said straight line D, and said main part of the carcass reinforcement having a substantially rectilinear meridian profile between its point of tangency T to the anchoring bead wire and a point A located at a distance $H_A$ from the base D of between 35% and 65% of the radial distance $H_E$ between the points of maximum axial width of said carcass reinforcement and said base D.

The presence of a third profiled member of very high modulus of elasticity and included axially between the carcass reinforcement upturn and the layer of rubber mix which effects the contact with the rim flange and the secant modulus of elasticity in tension of which is between 10 and 15 MPa, avoids virtually any rotational movement of the anchoring bead wire of the carcass reinforcement, whatever the structure of said bead wire, the effect obtained however being significantly greater for a bead wire of the "braided" type.

It is particularly advantageous for the third profiled member to be extended, radially to the inside, so as to be able to be turned up about the bead wire assembly and thus to cover at least half a circumference of the above assembly. "Bead wire assembly" as used herein means an assembly formed mainly of the bead wire, the carcass reinforcement and possibly one or more additional reinforcement armatures.

The anchoring bead wire of the carcass reinforcement is generally surrounded by a layer of vulcanized mix: the secant modulus of elasticity in tension of said layer which surrounds the anchoring bead wire will be substantially equal to the secant modulus of elasticity in tension of the third profiled member.

The life of the bead comprising such profiled members will be improved by the addition, between the main part of the carcass reinforcement and the carcass reinforcement upturn, of a reinforcement armature formed of a ply of radial reinforcement elements which is wound around the anchoring bead wire to form two strands, the radially upper end of the axially inner strand being radially located at a distance $H_{LI}$ from the base of the bead of between 80% and 160% of the distance $H_{RNC}$, the radial distance between the end of the carcass reinforcement upturn and the base of the bead, located axially to the inside of the upturn of the carcass reinforcement, preferably having its radially upper end radially closer to the axis of rotation than the end of the carcass reinforcement upturn, the distance $H_{LE}$ between said end and the base of the bead being between 0.2 and 0.8 times the height $H_{RNC}$ of the carcass reinforcement upturn.

DESCRIPTION OF THE DRAWING

The characteristics of the invention will be better understood with reference to the following description which refers to the drawings, which illustrate in non-limitative manner examples of embodiments of the invention.

DESCRIPTION OF PREFERRED EMBODIMENTS OF THE INVENTION

Figure 1:
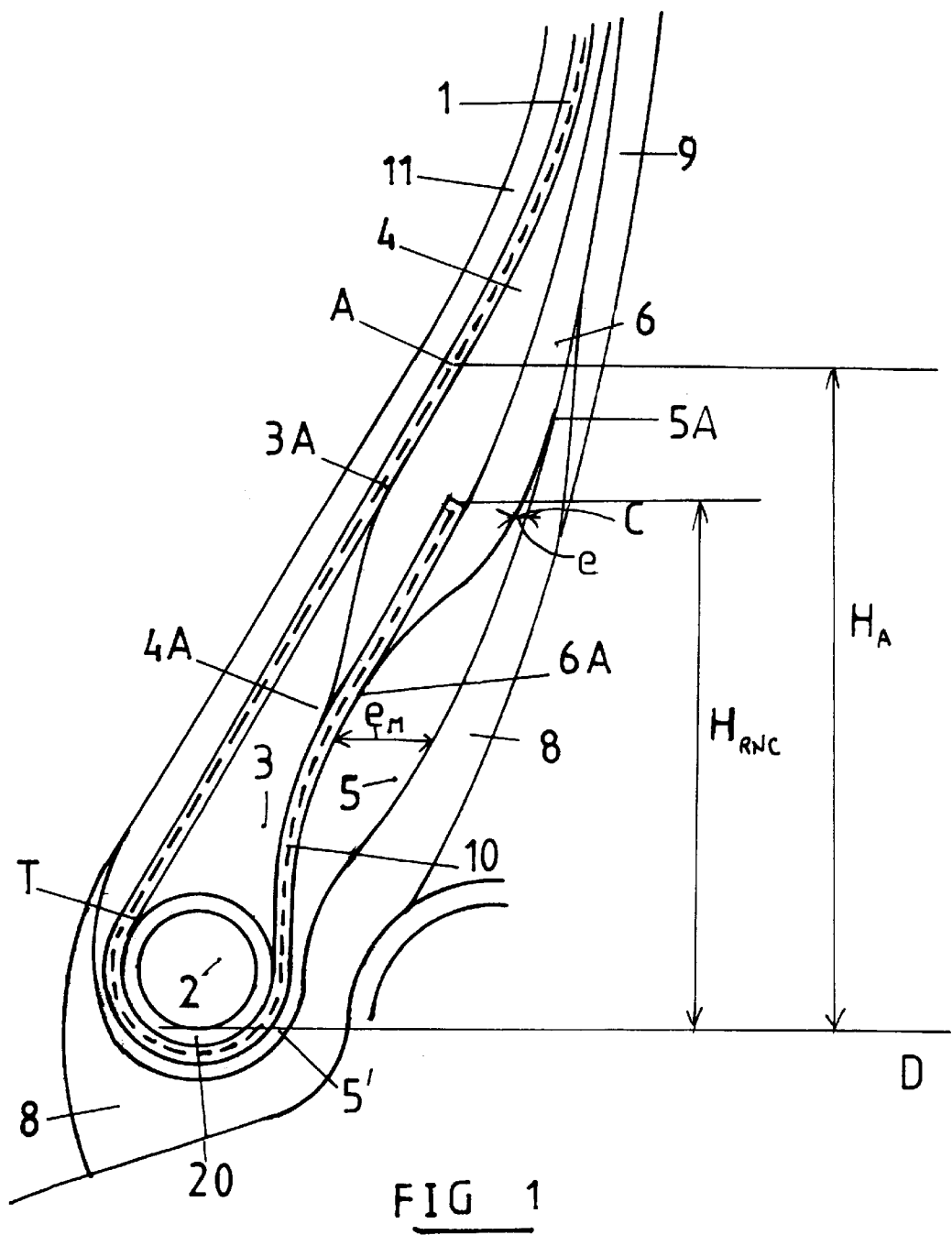
FIG. 1 is a schematic, viewed in meridian section, of a first bead variant according to the invention.

The bead B shown in FIG. 1 is that of a 305/70 R 22.5 tire, intended to be mounted on a rim comprising rim seats inclined at 15°. Around said bead wire 2 there is anchored a carcass reinforcement 1 composed of a single ply of practically inextensible metal cables, which is anchored in each bead to a bead wire 2 coated by a vulcanized layer of rubber 20 to form an upturn 10. Between a point A, located at a distance $H_A$ from the base D of the beads, said base being by convention represented by the straight line parallel to the axis of rotation passing through the point of the bead wire 2 closest to said axis of rotation, equal to 50% of the radial distance $H_E$ between the points of maximum axial width of said carcass reinforcement and said base D, and its point of tangency T to the bead wire 2 provided with the coating layer 20, the carcass reinforcement 1 has in its main part a substantially rectilinear meridian profile. "Substantially rectilinear" is understood to mean, firstly, a rectilinear profile and, secondly, a slightly concave or convex profile, the deflection of which in its center is at most equal to 1% of $H_E$. In this embodiment, the radial distance $H_{RNC}$ between the radially upper end of said upturn 10 and the base D of the bead is less than the distance $H_A$.

Between the carcass reinforcement 1 and its upturn 10, radially above the bead wire 2, there is arranged a first profiled member or first bead filler 3 of vulcanized rubber mix, the secant modulus of elasticity in tension $M_{10}$ of which is equal to 10 MPa. The modulus $M_{10}$ represents, for a given rubber mix, the ratio between the tensile stress $\sigma_{10}$ for a relative elongation $\delta L/L$ of 10% and said elongation, L being the initial length of the test piece and $\delta L$ the elongation of the test piece. Said modulus $M_{10}$ is determined in accordance with the standard AFNOR-NFT-46-002 of September 1988, under normal conditions of temperature and humidity in accordance with the standard AFNOR-NF-T40-101 of December 1979. Said filler 3 is extended radially by a second profiled member or second bead filler 4 of vulcanized rubber mix having a secant modulus $M_{10}$ of 4 MPa, measured under the same conditions as the filler 3.

Axially to the outside of the carcass reinforcement upturn 10 there is placed a third profiled member 5 of vulcanized rubber mix of substantially lozenge-shaped form, the secant modulus of elasticity in tension $M_{10}$ of which is equal to 45 MPa. Said profiled member 5 is extended radially to the inside by a layer 5' of the same mix of substantially constant thickness and extending around the assembly formed by the bead wire 2 and its coating 20. It is radially surmounted by a fourth profiled member 6 of vulcanized rubber mix of a secant modulus of elasticity in tension $M_{10}$ of 4 MPa, and therefore equal to the modulus $M_{10}$ of the second bead filler 4.

The radially upper end 3A of the first filler 3 is located at a radial distance from the bead base D which is greater than the distance $H_{RNC}$, whereas the radially lower end 4A of the profiled member 4 is located radially, as known per se, below the end of the carcass reinforcement upturn. As for the radially upper end of the profiled member 4, it is substantially located at the level of the maximum axial width of the tire.

Whereas the radially upper end of the profiled member 6 (not shown) is substantially located, like the upper end of the profiled member 4, at the level of the maximum axial width of the tire, while being radially above said end of the profiled member 4, its junction with the third profiled member 5 is such that its radially lower end 6A is spaced apart radially from the straight line D by a distance less than the distance $H_{RNC}$ between the end of the upturn 10 of the carcass reinforcement and said base D. As for the radially upper end 5A of the third profiled member 5, it may be located at a radial distance from the straight line D which may be less or more than the distance $H_{RNC}$, but the thickness e of the profiled member 5, measured on a straight line parallel to the axis of rotation, radially decreasing towards the outside, the point C of the straight line parallel to the axis of rotation for which said thickness is equal to 10% of the maximum thickness $e_M$ being distant from the straight line D by a quantity which in all cases is less than the value $H_{RNC}$.

The layer 8 of vulcanized rubber mix which forms the outside of the bead B and effects the contact with the mounting rim has a secant modulus of elasticity in tension, in the example described, of 11 MPa. In other embodiments, the vulcanized rubber mix has a secant modulus of elasticity in tension of between 10 and 15 MPa. The bead B is finished off by a sidewall layer 9 and an inner layer 11, formed respectively of rubber mixes suitable for their functions.

Figure 2:
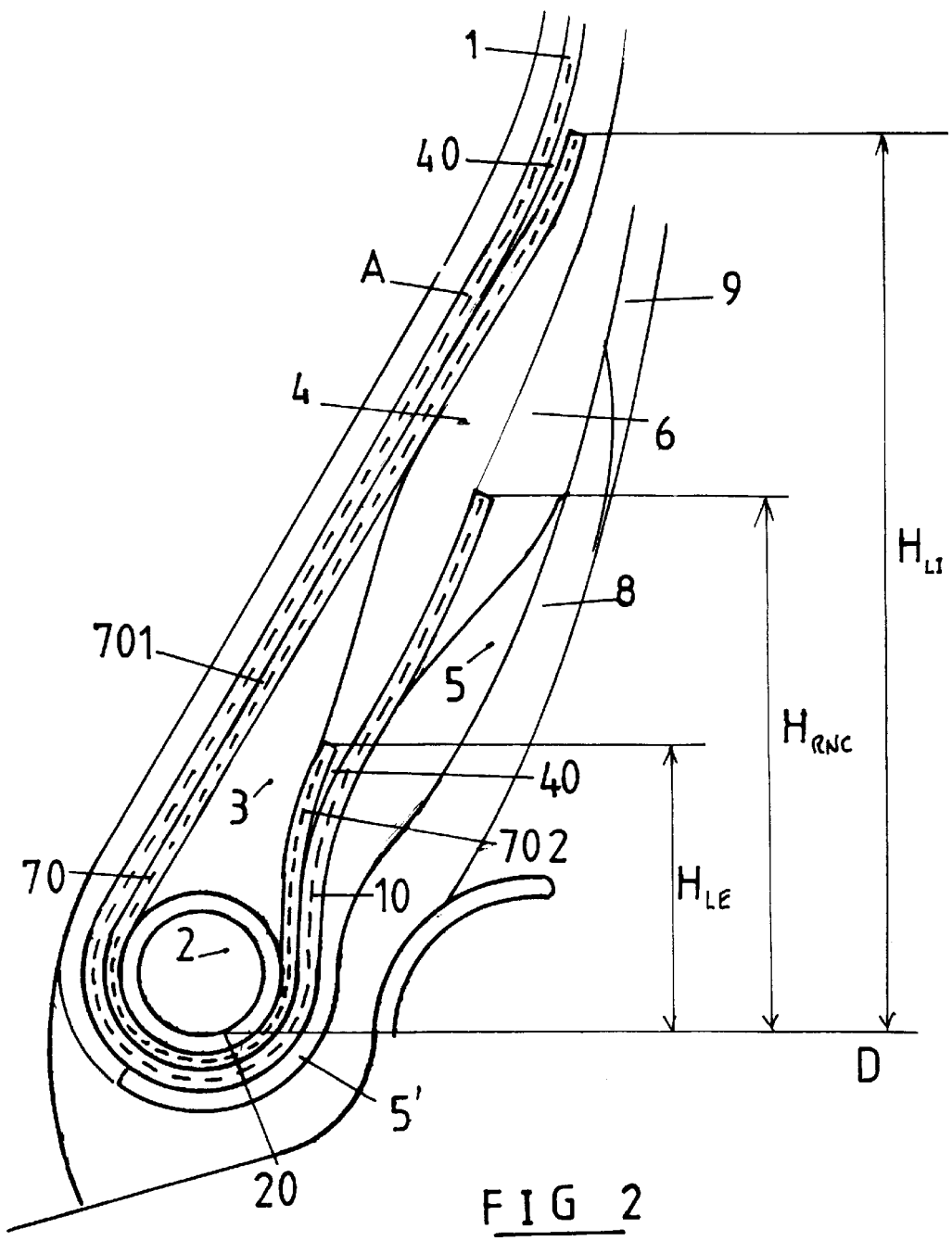
FIG. 2 is a schematic of a second variant.

The second example, described and illustrated in FIG. 2, differs from the example illustrated in FIG. 1 by the presence between the carcass reinforcement 1 and its upturn 10 of an additional reinforcement armature 7 of the bead B. Axially to the outside of the non-upturned part of the carcass ply 1 and, after turning up around the bead wire 2, axially to the inside of the upturn 10 of the ply 1, there is arranged a bead reinforcement armature 7 composed, in the example described, of a single ply 70, so as to form two strands, an axially inner strand 701 and an axially outer strand 702. The radially upper ends respectively of the two strands 701 and 702 are located relative to the base of the bead at heights $H_{LI}$ and $H_{LE}$, the distances $H_{LE}$ and $H_{LI}$ being respectively equal to 40% and 150% of the distance $H_{RNC}$. The ply 70 of said reinforcement is formed of radial metal cords or cables, in the example described oriented at 90° to the circumferential direction (reinforcement elements forming an angle within the range −85°, +85° with the circumferential direction will be considered to be radial). Axially to the outside of the axially outer strand 702 of the reinforcement ply 70 and of the upturn 10 of the carcass reinforcement 1, there is located the filler 5 of very high modulus of elasticity, since it is equal in this case to 40 MPa, said filler 5, as in the preceding cases, being radially surmounted by a profiled member 6 having the same properties as the profiled members 6 in the examples of FIGS. 1 and 2. The edge of the axially inner strand 701 and the axially outer edge 702 of said ply 70 are axially substantially parallel respectively to the non-upturned part and to the upturn 10 of the carcass ply 1, while being decoupled from said part and said upturn by a layer of rubber mix 40.

Figure 3:
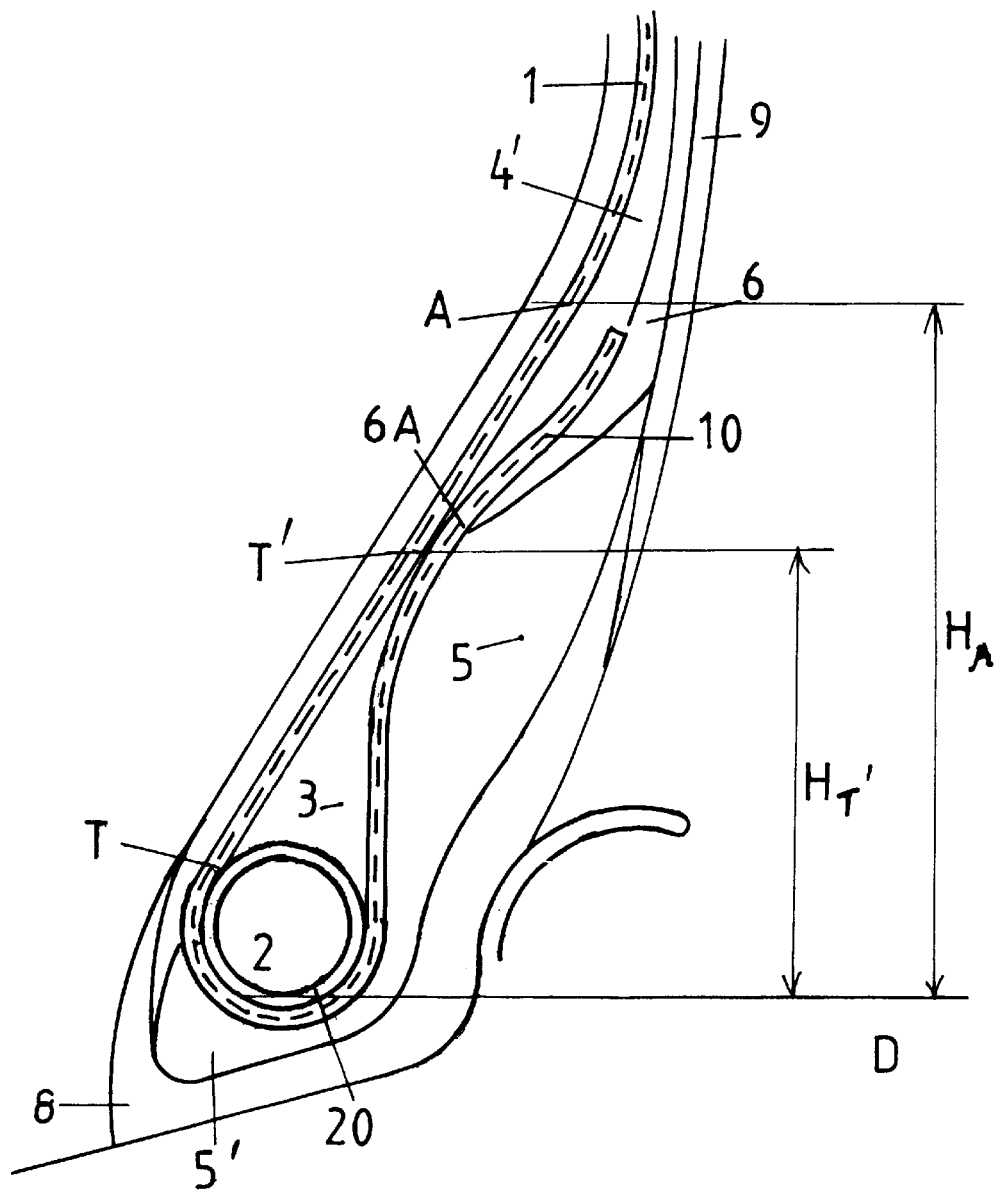
FIG. 3 is a schematic of a third variant.

The third variant, shown in FIG. 3, differs from the variant of FIG. 1 in that the upturn 10 of the carcass reinforcement 1 axially forms a tangent to the main part of the carcass reinforcement in the region of the point A previously defined and in which the carcass reinforcement 1 has a substantially rectilinear meridian profile. "Region of the point A" is to be understood to mean a radial distance of at most 20% of the radial distance HE between the points of maximum axial width of said carcass reinforcement and the base D of the bead. In the case specifically described, the point of tangency T' between the main part of the carcass reinforcement 1 and its upturn 10 is at a radial distance HT from the base D equal to 35% of the height HE, whereas the point A is at the distance HA equal to 50% of HE. Axially below said point of tangency T', the carcass reinforcement 1 and upturn 10 are axially separated by a first bead filler 3, the secant modulus of extension of which is equal to 10 MPa. In other embodiments, the secant modulus of extension of the first bead filler 3 is between 8 and 10 MPa. Radially above the point T' there is located a decoupling layer 4', between the upper edge of the upturn 10 ("edge of a reinforcement ply" is to be understood to mean a part of said ply having, starting from its end, a length of at least 15 mm), and in particular the end of said upturn 10, and the main part of the carcass reinforcement 1, said layer possibly having a constant thickness, generally between two and three times the thickness of the carcass reinforcement, and the rubber mix constituting said layer 4' having the same composition and properties as the mix of the profiled member 4 used in the preceding two examples. Axially to the outside of the upturn 10 there are arranged two profiled members 5 and 6 formed respectively of the same mixes as those of the profiled members 5 and 6 of the first example described, the radially lower end 6A of the profiled member 6 being located radially slightly above the point of tangency T'. The profiled member 5 has the special feature of being extended by a layer 5' formed of the same mix as the mix of the profiled member 5, but of variable thickness so as to have a virtually triangular shape in the region of the toe of the bead.

I claim:

1. A tire having a radial carcass reinforcement comprising a main part and an upturn, wherein said carcass reinforcement is anchored in each bead to an anchoring bead wire to form said upturn, said anchoring bead wire being surmounted radially by a first profiled member of vulcanized rubber mix and of a substantially triangular shape when viewed in meridian section, the upper edge of said upturn being separated from the main part of said carcass reinforcement by a second profiled member of vulcanized rubber mix, wherein the secant modulus of elasticity in tension $M_{10}$ of said first profiled member is between 8 and 10 MPa, the secant modulus of elasticity in tension $M_{10}$ of said second profiled member is between 3 and 5 MPa, a third profiled member of vulcanized rubber mix is arranged axially to the outside of said upturn and the secant modulus of elasticity in tension $M_{10}$ of which is between 35 and 50 MPa, a fourth profiled member radially surmounting said third profiled member has a secant modulus of elasticity in tension $M_{10}$ of between 3 and 5 MPa, the radially inner end of said fourth profiled member being radially inward of the end of said upturn, said third profiled member having a thickness e which decreases from a maximum thickness $e_M$ at a location radially inward of the end of said upturn towards the outside of said location, such that the thickness of said third profiled member is 10% of the maximum thickness $e_M$ at a point that is radially inward of the end of said upturn, and the main part of said carcass reinforcement having a substantially rectilinear meridian profile between its point of tangency T to the anchoring bead wire and a position between 35% and 65% of the radial distance HE defined as the distance between base D of said bead and the point of maximum axial width of said carcass reinforcement.

2. The tire of claim 1, wherein said tire has a layer of rubber mix which effects contact with the rim flange, and wherein the secant modulus of elasticity in tension of said layer of rubber mix is between 10 and 15 MPa.

3. The tire of claim 1, wherein said anchoring bead wire is of the "braided" type.

4. The tire of claim 1, wherein said anchoring bead wire is surrounded by a layer of vulcanized rubber mix having a secant modulus of elasticity in tension $M_{10}$ that is substantially equal to the secant modulus of elasticity in tension $M_{10}$ of said third profiled member.

5. The tire of claim 1, wherein said third profiled member comprises at least one component; wherein said third profiled member comprises a layer of the same mix and of substantially constant thickness; wherein said layer is turned up around the bead wire assembly; and wherein said layer covers at least half the circumference of said assembly.

6. The tire of claim 1, further having reinforcement armature comprising a ply of radial reinforcement elements wound around said anchoring bead wire to form two strands, respectively axially to the outside of the main part of said carcass reinforcement and axially to the inside of said upturn, wherein the radially upper end of said axially inner strand is radially located at a distance $H_{LI}$ from base D of said bead of between 80% and 160% of distance $H_{RNC}$, the radial distance between the end of said upturn and base D of said bead, and the axially outer strand, wherein the radially upper end of said axially outer strand is closer to the axis of rotation than the end of said upturn, and wherein the distance $H_{LE}$ between the radially upper end of said axially outer strand and base D of said bead is between 0.2 and 0.8 times the height $H_{RNC}$ of said upturn.

7. The tire of claim 1, wherein said upturn forms a tangent T' to the main part of said carcass reinforcement, wherein T' is located radially in the region extending over a radial distance of at most 20% of the radial distance $H_E$, in the region of point A, wherein radially below T' said carcass reinforcement and said upturn are axially separated by said first profiled member, and wherein radially above T' said carcass reinforcement and said upturn are axially separated from the main part of said carcass reinforcement by said second profiled member.

8. The tire of claim 7, wherein the upper edge of said upturn is the end of said upturn.

* * * * *